US011520797B2

(12) United States Patent
Blank et al.

(10) Patent No.: US 11,520,797 B2
(45) Date of Patent: Dec. 6, 2022

(54) LEVERAGING TIME-BASED COMMENTS ON COMMUNICATIONS RECORDINGS

(71) Applicant: salesforce.com, inc., San Francisco, CA (US)

(72) Inventors: Rachel Blank, Orlando, FL (US); Fabiha Johura Hannan, San Francisco, CA (US); Akanksha Grover, Pacifica, CA (US); Priyank Saxena, Danville, CA (US); Amit Sharma, Vancouver (CA); Samson Richard Wong, San Jose, CA (US); Dinesh Rohra, Dublin, CA (US); Kapil Agarwal, Fremont, CA (US); Katharine Grace Bowerman, Reston, VA (US)

(73) Assignee: Salesforce, Inc., San Francisco, CA (US)

( * ) Notice: Subject to any disclaimer, the term of this patent is extended or adjusted under 35 U.S.C. 154(b) by 68 days.

(21) Appl. No.: 17/118,993

(22) Filed: Dec. 11, 2020

(65) Prior Publication Data

US 2022/0188319 A1 Jun. 16, 2022

(51) Int. Cl.
| | |
|---|---|
| G06F 16/2457 | (2019.01) |
| G06F 16/23 | (2019.01) |
| G06F 16/683 | (2019.01) |
| G06N 20/00 | (2019.01) |
| H04M 3/51 | (2006.01) |
| G06Q 30/00 | (2012.01) |

(52) U.S. Cl.
CPC .... *G06F 16/24573* (2019.01); *G06F 16/2379* (2019.01); *G06F 16/685* (2019.01); *G06N 20/00* (2019.01); *H04M 3/5175* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |

(Continued)

*Primary Examiner* — Richard L Bowen
(74) *Attorney, Agent, or Firm* — Dergosits & Noah LLP; Todd A. Noah

(57) ABSTRACT

Leveraging time-based comments on communications recordings is described. A system determines a comment time for a communications recording associated with a database record. The system receives a comment for the communications recording and generates a comment thread which includes the comment. If a media player is displaying a player control that is associated with the communications recording, the system causes the comment time and the comment thread and/or a comment thread indicator to be displayed with the player control that is displayed by the media player. The system initiates generation of a feed item, which includes the comment and references the communications recording, thereby causing the output of the feed item via an information feed associated with the database record to any system user associated with the database record.

20 Claims, 10 Drawing Sheets

(56) References Cited

U.S. PATENT DOCUMENTS

| | | |
|---|---|---|
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,097,631 B2 * | 10/2018 | Tevosyan ............... H04L 51/32 |
| 11,170,336 B2 * | 11/2021 | Kaimal ............ G06Q 10/06398 |
| 11,206,235 B1 * | 12/2021 | Sarkar ................... H04L 65/605 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2018/0176276 A1 * | 6/2018 | Gandhi ................. H04L 51/046 |
| 2018/0192142 A1 * | 7/2018 | Paul ................. H04N 21/44245 |
| 2020/0186454 A1 * | 6/2020 | Thapliyal ............. H04L 65/601 |

* cited by examiner

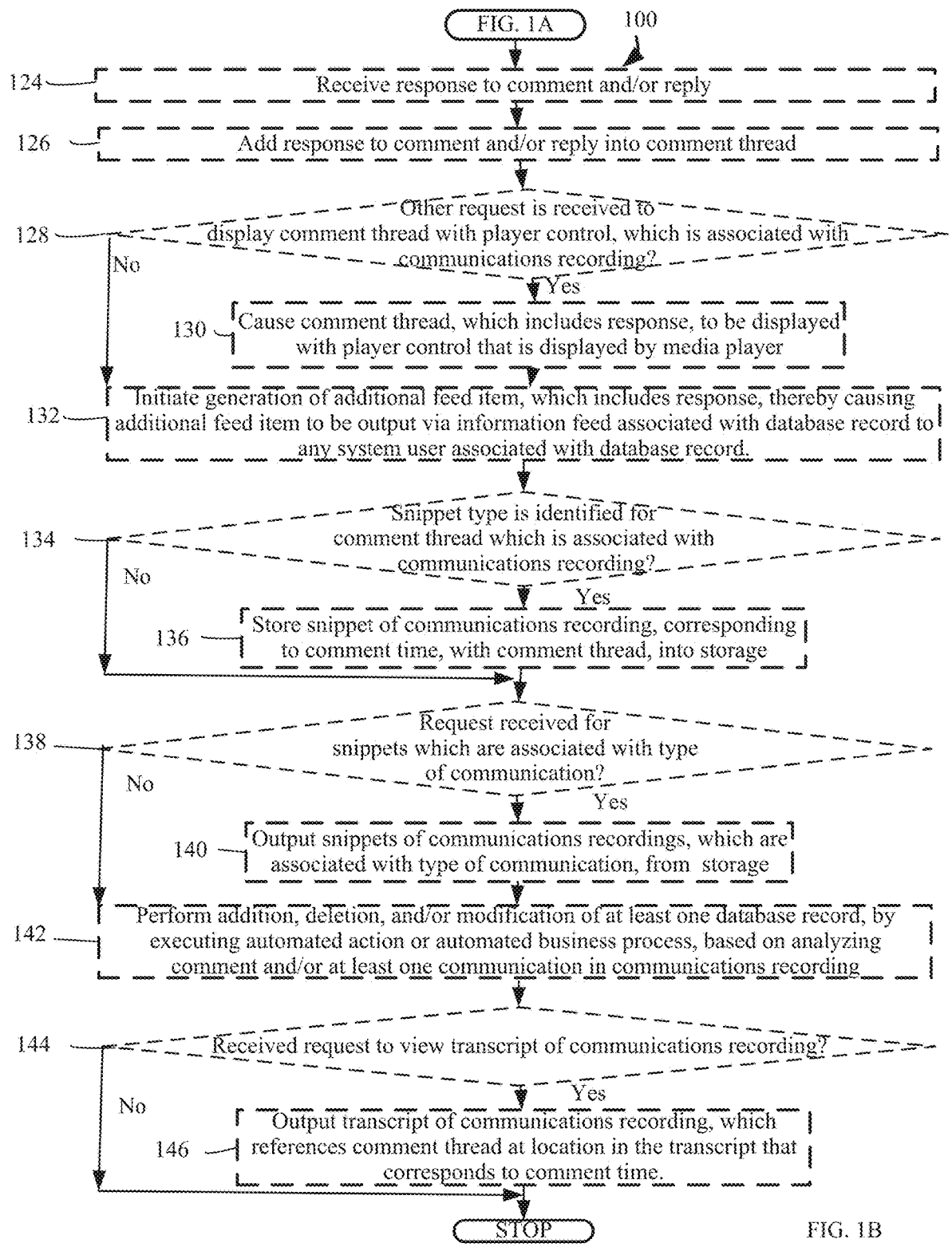

LEVERAGING TIME-BASED COMMENTS ON COMMUNICATIONS RECORDINGS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many organizations store communications recordings, such as recordings of phone calls or presentations, in data storage silos that are not easily accessible by the organization's workers. For example, upon making a phone call to customer support for a product or a service, a customer is greeted with an automated message which says, "your call may be recorded for quality purposes." Even if the customer's phone call is recorded, an organization might do nothing with the call recording if a supervisor of customer support agents determines that listening to every call recording and taking notes about the conversations between customers and customer support agents is too time consuming, expensive, and tedious.

BRIEF SUMMARY

In accordance with embodiments, there are provided systems and methods for leveraging time-based comments on communications recordings. A system determines a comment time for a communications recording that is associated with a database record. The system receives a comment on the communications recording and generates a comment thread which includes the comment. If a media player is displaying a player control that is associated with the communications recording, the system causes the comment time and the comment thread and/or a comment thread indicator to be displayed with the player control that is displayed by the media player. The system initiates the generation of a feed item, which includes the comment and references the communications recording, thereby causing the output of the feed item in an information feed associated with the database record to any system user associated with the database record.

For example, a component in an audio player receives a MegaCorp customer support supervisor's selection of a timeline location displayed by the audio player, which is playing an audio recording of a phone call. Beginning at 11.5 seconds into the call's recording, the supervisor hears a MegaCorp customer support agent tell a buyer for the customer Acme Partners Inc. that her requested MegaCorp business product was no longer available, without offering any of MegaCorp's business products as replacements. The audio player component determines that the MegaCorp supervisor clicks on the audio player's timeline at 11.5 seconds into the call's recording, which is linked by MegaCorp's Customer Relationship Management (CRM) system to MegaCorp's CRM account record for Acme Partners Inc. The audio player component receives the MegaCorp supervisor's comment on the call's recording, which asks a MegaCorp CRM administrator to modify their CRM system to recommend MegaCorp's business products as replacements when indicating that the requested business product is no longer available, and creates a comment thread that includes the supervisor's comment. When the CRM administrator uses the audio player to display the timeline for the call's recording, the audio player component causes the audio player's user interface to display a comment thread indicator at the 11.5 seconds timestamp on the timeline for the call's recording. The audio player component initiates generation of a feed item that includes the supervisor's comment on the call's recording, which causes the output of this feed item via MegaCorp's information feed for the Acme account to all of MegaCorp's CRM system users who are subscribed to the Acme account's information feed, including both the primary MegaCorp sales representative and the MegaCorp sales manager for the Acme account.

By adding a comment thread at each user-selected time on an audio player's timeline for an audio recording, an audio player component enables customer support supervisors, customer support agents and their fellow employees who may be interested in the topics of a phone call to easily discuss and capture their impressions of the audio recording of the phone call. The audio recording's comment thread is embedded in the context of a database system's CRM record, which the database system can use to integrate with other features and to trigger automation tools and artificial intelligence analysis. Although examples describe the functioning of the audio player component in the context of a CRM database system, the audio player component's capabilities may be extended to other environments where communications are stored in audio and/or video recordings, such as legal depositions, sales negotiations, and medical transcriptions.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 1A-B are operational flow diagrams illustrating a high-level overview of a method 100 for leveraging time-based comments on communications recordings, in an embodiment;

DETAILED DESCRIPTION

General Overview

Systems and methods are provided for leveraging time-based comments on communications recordings. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, a method, frames, a data flow, and systems for leveraging time-based comments on communications recordings will be described with reference to example embodiments.

While one or more implementations and techniques are described with reference to an embodiment in which leveraging time-based comments on communications recordings are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Figure 1A:
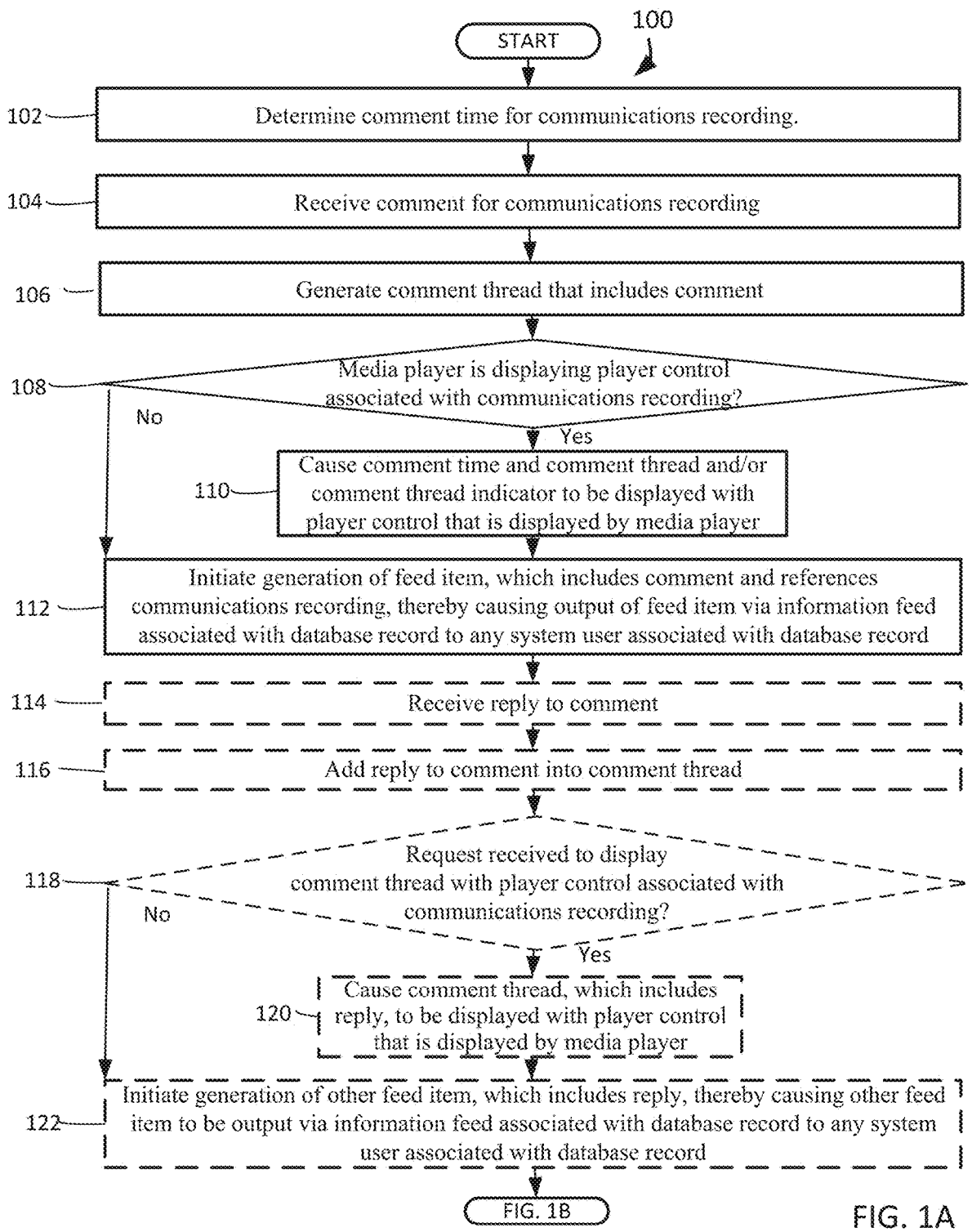
Figure 2:
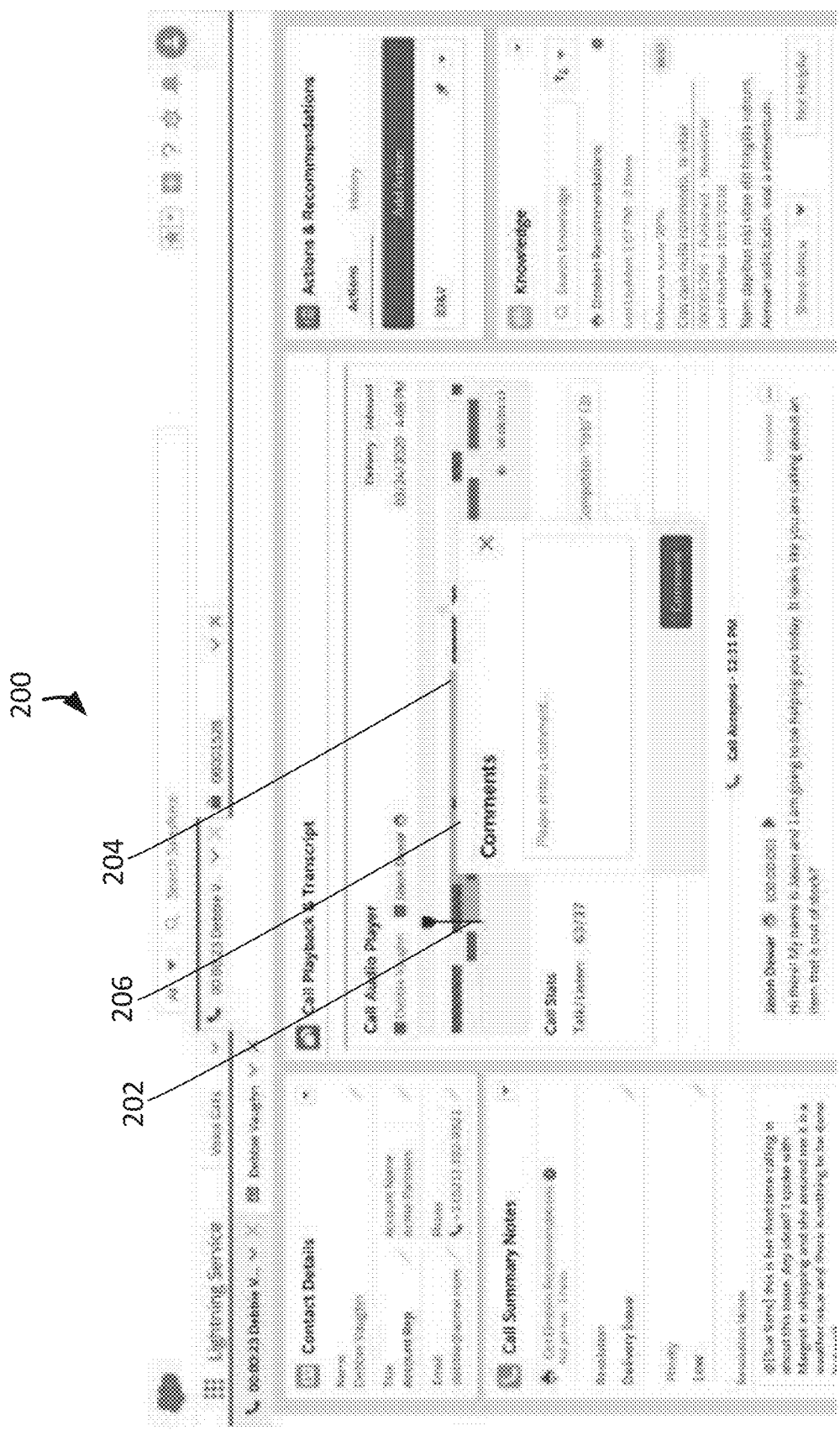
FIG. 2 depicts a frame 200 of an example user interface screen, which includes a popover comment entry box, for leveraging time-based comments on communications recordings, in an embodiment.

FIGS. 1A-B are operational flow diagrams illustrating a high-level overview of a method 100 for leveraging time-based comments on communications recordings. A comment time is determined for a communications recording which is associated with a database record, block 102. An audio player component identifies the time of a communications recording that is selected for a comment. By way of example and without limitation, this can include a component in an audio player determining that Rachel Steiner, a MegaCorp customer support supervisor, clicked on an audio player's timeline at 11.5 seconds into the recording of the call between Jason Dewar, a MegaCorp customer support agent, and Debbie Vaughn, a buyer for the MegaCorp customer Acme Partners Inc., as depicted by the timeline location 202 in the frame 200 of FIG. 2. Although this example describes the determination of a comment time that is based on a user clicking on a timeline location, an audio player component can enable users to select comment times in other ways, such as by the user typing "11.5 seconds" or speaking "11.5 seconds."

A comment time can be a chronological indication that is associated with a remark that expresses an opinion. A communications recording can be an exchange of information that is converted into a persistent form. A database record can be a structured set of related items of information that are handled as a unit by a computer.

The comment time may correspond to a start time of a part of the communications recording and a stop time of the part of the communications recording. For example, after clicking on the timeline location 202 which corresponds to 11.5 seconds into a recording of a call, Rachel Steiner, a MegaCorp customer support supervisor, clicked on the audio player's timeline at 32.5 seconds into the recording of the call between Jason Dewar, a MegaCorp customer support agent, and Debbie Vaughn, a buyer for the MegaCorp customer Acme Partners Inc., as depicted by the timeline location 204 in the frame 200 of FIG. 2. By selecting a start time and a stop time for a comment on a communications recording, a user applies the comment on the communications recording to a time range of the communications recording. After determining a comment time for a communications recording which will be associated with a comment, the audio player component displays a comment entry box to the user, such as the popover comment entry box 206 as depicted in the frame 200 of FIG. 2.

A start time can be a chronological measure of a beginning of an activity or event. A stop time can be a chronological measure of an ending of an activity or event. A part can be a portion of an entity.

A database system can link a database record to a communications recording before, during, or after the creation of the communications recording. For example, MegaCorp's CRM system can link a call's recording to MegaCorp's CRM account record for Acme Partners Inc. before the call if MegaCorp's phone system recognizes the phone number of the incoming call. In another example, MegaCorp's CRM system can link a call's recording to MegaCorp's CRM account record for Acme Partners Inc., during the call or after the call, depending on when a linking command is received from the customer support agent, which may require the agent to create a new CRM record for a caller who appears to be a new customer.

In addition to determining a comment time for a communications recording, a comment is received for the communications recording, block 104. The audio player component receives time-based comments about communications recordings. In embodiments, this can include the audio player component receiving a comment 302 by Rachel Steiner, a MegaCorp customer support supervisor, on the audio recording of a call between Jason Dewar, a MegaCorp customer support agent, and Debbie Vaughn, a buyer for the MegaCorp customer Acme Partners Inc., as depicted in the frame 300 of FIG. 3. Rachel's comment 302 includes an at-mention for Cindy Baker, a MegaCorp CRM administrator, and asks Cindy to modify the MegaCorp CRM system to recommend MegaCorp's business products as replacements when indicating that the requested MegaCorp Biz Pro Plan product is no longer available, as depicted in the frame 300 of FIG. 3. Although the preceding examples describe an audio player component determining the time(s) for a comment on a communications recording before receiving the comment on the communications recording, the audio player component may receive the comment on the communications recording before determining the time(s) for the comment on the communications recording. A comment can be a remark that expresses an opinion.

After the receipt of a comment on a communications recording, a comment thread is generated which includes the comment, block 106. The audio player component initiates a comment thread for the first comment for a timestamp of a communications recording. For example, and without limitation, this can include the audio player component creating a comment thread 304 which includes the comment 302 by Rachel Steiner, a MegaCorp customer support supervisor, for the time range from 11.5 to 32.5 seconds of the audio recording of the call between Jason Dewar, a MegaCorp customer support agent, and Debbie Vaughn, a buyer for the MegaCorp customer Acme Partners Inc., as depicted in the frame 300 of FIG. 3. A comment thread can be a computer structure that enables the linking of separate elements, each of which include a remark that expresses an opinion.

Following the creation of a comment thread for a communications recording, whether a media player is displaying a player control, which is associated with the communications recording, is determined, block 108. The audio player component determines when a media player needs to indicate that a communications recording has a time-based comment. By way of example and without limitation, this can include the audio player component determining whether Cindy Baker, a MegaCorp CRM administrator, is using an audio player to display the timeline for the audio recording of the call between Jason Dewar, a MegaCorp customer support agent, and Debbie Vaughn, a buyer for the MegaCorp customer Acme Partners Inc. If a media player is displaying a player control, which is associated with a communications recording, the method 100 continues to block 110 to indicate whether any comments have been made on the communications recording. If a media player is not displaying a player control, which is associated with a communications recording, the method 100 proceeds to block 112 to use an information feed to output a feed item that includes any comments on the communications recording to users who subscribe to the communications recording's database record.

A player control can be an entity that a user selects to enact, change, adjust, or monitor the process of listening to an audio recording or watching a video recording. Examples of player controls include icons and/or text for play, pause, stop, reverse, fast-forward, and fast-backward. A player control can also be a progress bar, a playback bar, or a selectable timeline, which a user selects to identify the current position in the duration of the current recording, change the playback position in the current recording to correspond to the relative position that the user selected on the player control, or identify a corresponding time in the current recording that will be associated with a user-created comment.

Figure 3:
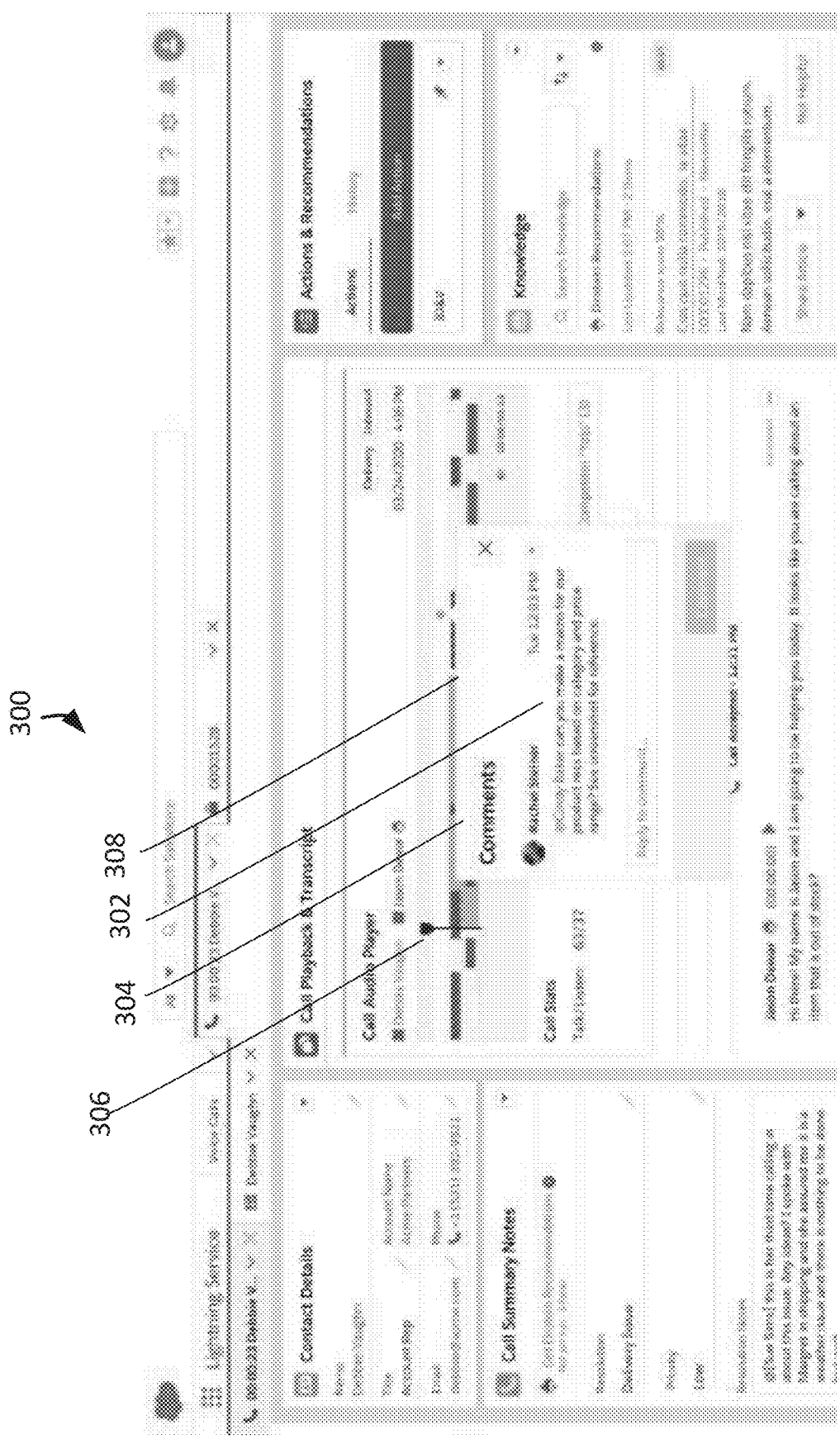
FIG. 3 depicts a frame 300 of an example user interface screen, which includes a popover comment, for leveraging time-based comments on communications recordings, in an embodiment.

If a media player is displaying a player control, which is associated with a communications recording, a comment time and a comment thread and/or a comment thread indicator are caused to be displayed with the player control that is displayed by the media player, block 110. The audio player component indicates whether a communications recording's timeline has a time-based comment. In embodiments, this can include the audio player component causing the audio player's user interface to display the comment thread indicators 306 and 308 for the time range between the 11.5 seconds timestamp and the 32.5 seconds timestamp on the timeline for the audio recording of a call, when Cindy Baker, a CRM administrator uses the audio player to display the timeline for the call's recording, as depicted in the frame 300 of FIG. 3. FIG. 3 depicts that the call was between Jason Dewar, a MegaCorp customer support agent, and Debbie Vaughn, a buyer for the MegaCorp customer Acme Partners Inc. A comment thread indicator can be an entity that represents a computer structure which enables the linking of separate elements, each of which include a remark that expresses an opinion.

A media player can be a type of application software for producing sounds from computer files such as audio files and video files. While examples describe a media player that plays a media recording as an audio player that plays an audio recording, the media player may also include a video player and the media recording may also include a video recording. Although this example describes the display of one set of comment thread indicators and no comment threads, the audio player component can display any number of comment thread indicators, any number of sets of comment thread indicators, and any number of comment threads. If a default display setting results in the audio player component initially displaying only comment thread indicators, a user can select any combination of comment thread indicators to view the corresponding comment threads.

Figure 4:
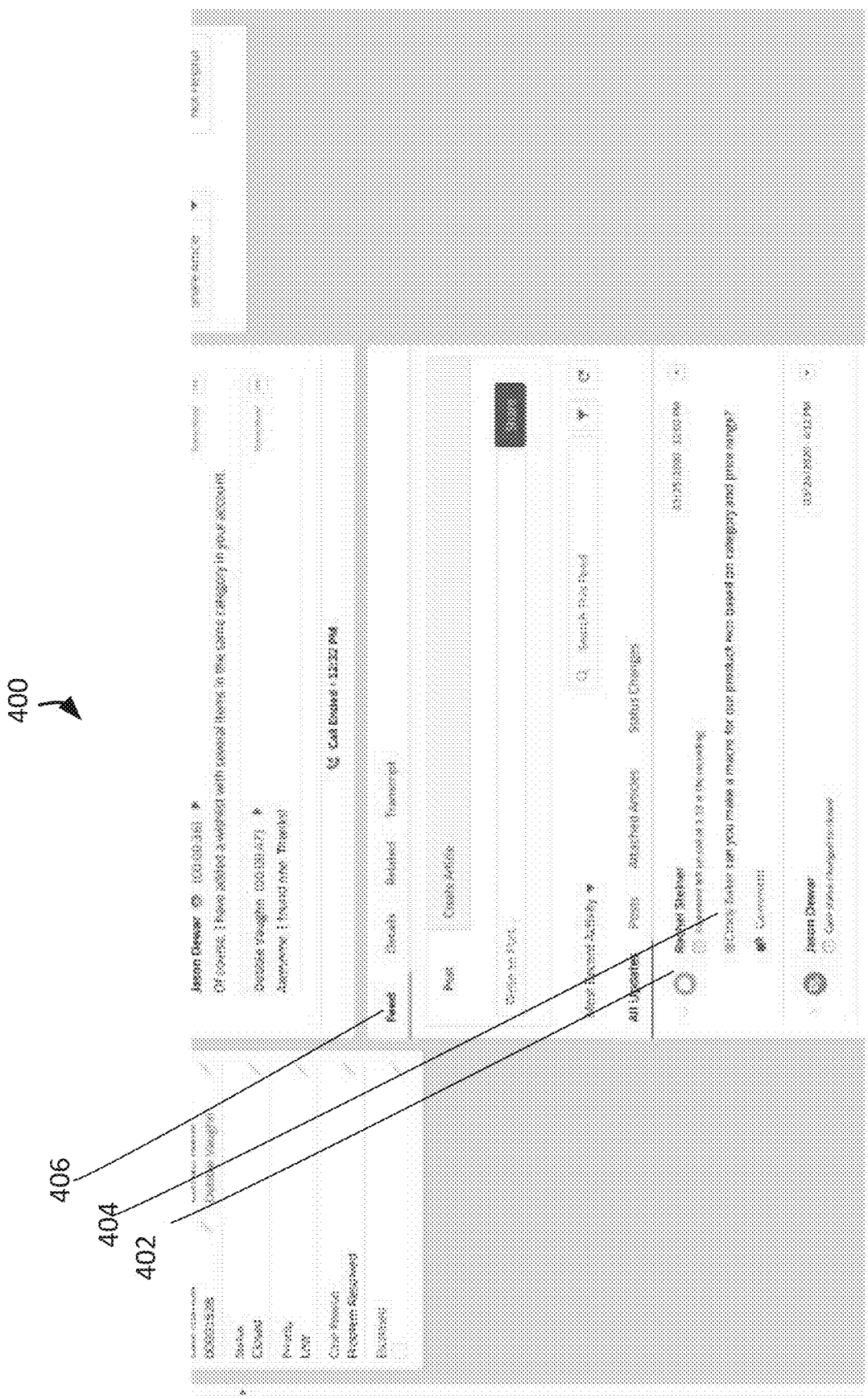
FIG. 4 depicts a frame 400 of an example user interface screen, which includes a comment in a feed item, for leveraging time-based comments on communications recordings, in an embodiment.

Having received a comment on a communications recording, a generation is initiated of a feed item, which includes the comment and references the communications recording, thereby causing the output of the feed item via an information feed associated with a database record to any system user associated with the database record, block 112. The audio player component initiates the generation of a feed item for a comment on a communications recording linked to a database record, which outputs the feed item via the database record's information feed to any users subscribed to the database record. For example, and without limitation, this can include the audio player component initiating generation of a feed item 402 that includes the comment 404 by Rachel Steiner, a MegaCorp customer support supervisor, for the time range of 11.5 to 32.5 seconds of the audio recording of the call between Jason Dewar, a MegaCorp customer support agent, and Debbie Vaughn, a buyer for the MegaCorp customer Acme Partners Inc., as depicted in the frame 400 of FIG. 4. Rachel's comment 404 includes an at-mention for Cindy Baker, a MegaCorp CRM administrator, and asks Cindy to modify the MegaCorp CRM system to recommend MegaCorp's business products as replacements when indicating that the requested MegaCorp Biz Pro Plan product is no longer available. By initiating the generation of the feed item 402, the audio player component causes the output of this feed item 402 via MegaCorp's information feed for the Acme account 406 to all of MegaCorp's CRM system users who are subscribed to the Acme account's information feed, including both the MegaCorp sales representative and the MegaCorp sales manager for the Acme account, as depicted in the frame 400 by FIG. 4.

A feed item can be information, such as a message or a story, about a database record. An information feed can be a combination, such as a list, of one or more elements that each include information about a database record. A system user can be a person who operates a computer.

The feed item 402 refers to the time that the call was recorded, 12:30 P.M., but could also or alternatively refer to the comment's time range for the recording, from 11.5 seconds to 32.5 seconds. The feed item 402 may display the time that the call was recorded as 12:30 P.M. if the day that the call was recorded is the same day that a user is viewing the feed item 402, and as Tuesday 12:30 P.M. if the day that the call was recorded is still during the same week that a user is viewing the feed item 402. The feed item 402 may display the time that the call was recorded as March 24 12:30 P.M. if the time that the call was recorded is still during the same year that a user is viewing the feed item 402, and as Mar. 24, 2020 12:30 P.M. if the time that the call was recorded is not the same year that a user is viewing the feed item 542.

A database system can create messages and/or stories for database records, create feed items that include these messages and/or stories, and provide these feed items through an online social network's information feeds which may be accessed by database users. An online social network, such as Chatter® which is provided by Salesforce.com® of San Francisco, Calif., can enable a user to subscribe to, or follow, data objects in the form of database records, such as cases, accounts, or opportunities. Such online social networks can be implemented in various settings, including enterprises such as business organizations or groups within such an organization. For example, Chatter® can be used by employee of a business organization to communicate and collaborate with each other for various purposes. Online social networks are increasingly becoming a common way to facilitate communication between individuals and groups of individuals, any of whom can be recognized as "users" of an online social networking system.

A database user can initiate the creation of a message, such as a comment, a post, or a status update, which may include text created by the user and can include other information as well. For example, a user makes a post to a wall section of a database record that includes multiple posts, which is organized in chronological order. A database record can have a record status, which may be updated only by the database record's owner, who could be a single user, multiple users, or a group of users. A database system can respond to an event, such as an update of a database record that may be triggered by a user's specific action, by generating text that is included in a story that represents the event.

An information feed generator may refer to any software program running on a processor, a dedicated processor, or combination thereof, that receives messages and/or stories for database records, generates feed items that include the messages and/or stories, identifies to which information feeds the feed items should be added, and adds the feed item to the appropriate information feeds. A feed item can include any combination of various types of data, such as character-based data, audio data, and video data. For example, a feed item can include text in combination with a JPEG image or an animated image. Feed items may include messages, which can include any combination of textual/character-based inputs such as words, phrases, statements, questions, answers, emotional expressions, symbols, and leetspeak; file uploads, such as presentations, documents, and multimedia files; indications of personal preferences which can be submitted as replies and responses to messages; status updates, and hyperlinks. A feed item about a particular record in the database can include messages about the record, which may be initiated by users, and stories about changes to the record. A feed item can represent an individual field change of a database record, the creation and/or deletion of a database record, or other events being tracked for a database record. Database record updates which are presented as a feed item can include a single update or a collection of individual updates. When adding a feed item to the appropriate information feeds, the information feed generator may add additional information or metadata to the feed item's message or story, such as by adding a document, identifying the sender of a message, listing a time range for a comment, or determining a level of importance.

A user can track the updates or changes to specific database records by subscribing to receive feed items for the database records that are of interest to the user. When the updates or changes to a database record occur, these updates and changes are published as feed items on an information feed of the user who subscribed to the database record. The information feed generator may aggregate all the feed items for the database records to which a user has subscribed in order to create a single information feed for the subscribing user, and provide the information feed to the home page of the subscribing user. Consequently, the user's information feed can inform a user about all the messages and stories related to the database records to which the user has explicitly or implicitly subscribed.

The information feed generator may de-duplicate feed items that can include messages and/or stories for numerous database records. For example, since a story about an Acme Partners buyer discussing MegaCorp's Biz Pro Plan product will be published to both the Acme account information feed and the Biz Pro Plan product information feed, and a sales representative has subscribed to both the Acme account and the Biz Pro Plan product, the information feed generator filters out duplicates before adding the feed items to the sales representative's information feed. Thus, the information feed generator may collapse feed items that include messages and/or stories for multiple database records based on a single transaction into a single feed item that includes a single message and/or a single story and ensure that the correct number of feed items which include the messages and/or the stories are sent to any particular information feed.

A database system may display an information feed, which could be composed of any types of feed items associated with a database record, on any type of page, such as the home page of the database record. When displaying an information feed, a database system may display a specific number of the feed items, such as 25, which include the most recent messages and/or stories, and a user can select an option to see additional feed items that include messages and/or stories. A user may separately view an information feed of a database record, such as by going to a home page for the database record. When a user subscribes to, or follows, database records, the information feed generator sends the feed items for the information feeds for the database records through a separate information feed application, which can provide the feed items for each of the information feeds to which the user is subscribed in a single information feed displayed to the user.

Figure 5:
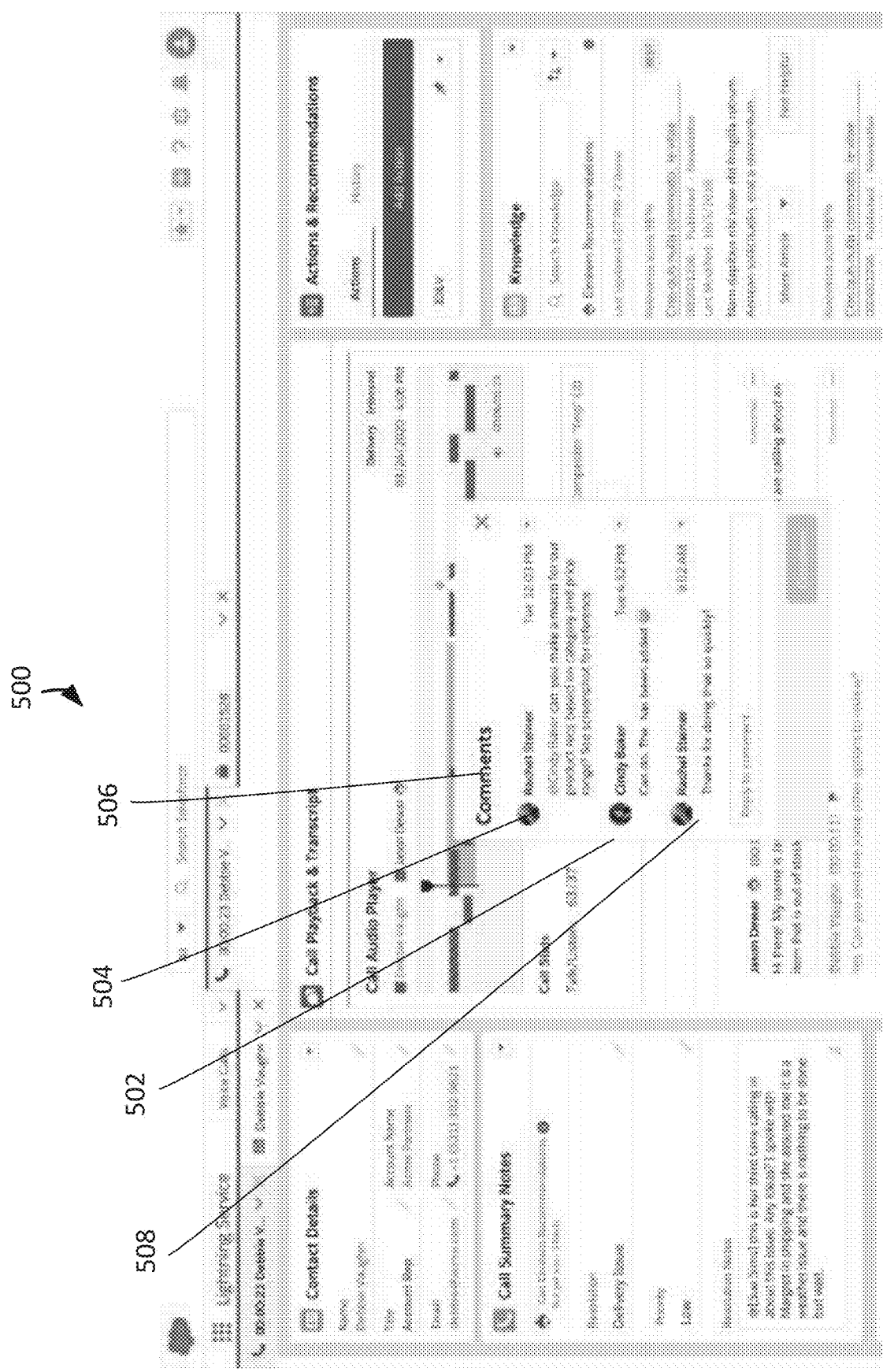
FIG. 5 depicts a frame 500 of an example user interface screen, which includes a popover comment thread, for leveraging time-based comments on communications recordings, in an embodiment.

Having output a feed item, which includes a comment on a communications recording, via a database record's information feed to users subscribed to the database record, a reply to the comment is optionally received, block 114. The audio player component can receive replies to comments about communications recordings. By way of example and without limitation, this can include the audio player component receiving a reply 502 by Cindy Baker, a MegaCorp CRM administrator, to the comment 504 by Rachel Steiner, a MegaCorp customer support supervisor, for the time range from 11.5 to 32.5 seconds of the audio recording of the call between Jason Dewar, a MegaCorp customer support agent, and Debbie Vaughn, a buyer for the MegaCorp customer Acme Partners Inc., as depicted in the frame 500 of FIG. 5. The audio player component enables any user who can read a comment in an audio player's comment thread or in a feed item in an information feed to respond to the comment by entering a response to either the audio player's comment thread or the feed item in the information feed. Cindy's reply 502 to Rachel's comment 504 confirms that Cindy modified the MegaCorp CRM system to recommend MegaCorp's business products as replacements when indicating that the requested MegaCorp Biz Pro Plan product is no longer available, as depicted in the frame 500 of FIG. 5. A reply can be a remark that expresses an opinion and may be referred to as a comment in a comment thread.

After receiving a reply to a comment, the reply to the comment is optionally added into a comment thread, block 116. The audio player component can add replies to comments about a communications recording to the comment thread for the communications recording. In embodiments, this can include the audio player component adding the reply 502 by Cindy Baker, a MegaCorp CRM administrator, to the comment 504 by Rachel Steiner, a MegaCorp customer support supervisor, to the comment thread 506 for the audio recording of the call between Jason Dewar, a MegaCorp customer support agent, and Debbie Vaughn, a buyer for the MegaCorp customer Acme Partners Inc., as depicted in the frame 500 of FIG. 5.

Following the addition of a reply to a comment into a comment thread, whether a request is received to display a comment thread with a player control, which is associated with a communications recording, is optionally determined, block 118. The audio player component can determine when a media player needs to display comments for a communications recording's timeline. For example, and without limitation, this can include the audio player component determining whether Rachel Steiner, a MegaCorp customer support supervisor, is requesting an audio player to show the comment thread on the timeline for the audio recording of the call between Jason Dewar, a MegaCorp customer support agent, and Debbie Vaughn, a buyer for the MegaCorp customer Acme Partners Inc. If a request is received to display a comment thread with a player control, which is associated with a communications recording, the method 100 continues to block 122 to display any comments and replies that have been made on the communications recording. If a request is not received to display a comment thread with a player control, which is associated with a communications recording, the method 100 proceeds to block 124 to use an information feed to output a feed item that includes any comments and replies on the communications recording to users who subscribe to the communications recording's database record. A request can be an instruction to a computer to provide information or perform another function.

If a request is received to display a comment thread with a player control, which is associated with a communications recording, then the comment thread, which includes the reply, is optionally caused to be displayed with the player control that is displayed by media player, block 120. The audio player component can display replies to comments on communications recordings. By way of example and without limitation, this can include the audio player component displaying the comment thread 506 that includes the reply 502 to the comment 504 on the timeline from 11.5 to 32.5 seconds of the audio recording of the call between Jason Dewar, a MegaCorp customer support agent, and Debbie Vaughn, a buyer for the MegaCorp customer Acme Partners Inc., when Rachel Steiner, a MegaCorp customer support supervisor, requests an audio player to display the audio recording's comment thread, as depicted in the frame 500 of FIG. 5. Although this example describes the display of one comment thread, the audio player component can display any number of comment threads.

After the receipt of a reply to a comment on a communications recording, the generation is optionally initiated of another feed item, which includes the reply, thereby causing the other feed item to be output via the information feed associated with the database record to any system user associated with the database record, block 122. The audio player component can initiate the generation of a feed item for a reply to a comment on a communications recording linked to a database record, which outputs the feed item via the database record's information feed to any users subscribed to the database record. In embodiments, this can include the audio player component initiating the generation of a feed item 602, which includes the reply 604 by Cindy Baker, a MegaCorp CRM administrator, to the comment 606 by Rachel Steiner, a MegaCorp customer support supervisor, for the time range of 11.5 to 32.5 seconds of the audio recording of the call between Jason Dewar, a MegaCorp customer support agent, and Debbie Vaughn, a buyer for the MegaCorp customer Acme Partners Inc., as depicted in the frame 600 of FIG. 6. Cindy's reply 604 to Rachel's comment 606 confirms that Cindy modified the MegaCorp CRM system to recommend MegaCorp's business products as replacements when indicating that the requested MegaCorp Biz Pro Plan product is no longer available, as depicted in the frame 600 by FIG. 6. By initiating the generation of the feed item 602, the audio player component causes the output of this feed item 602 via MegaCorp's information feed 608 for the Acme account to all of MegaCorp's CRM system users who are subscribed to the Acme account's information feed, including both the primary MegaCorp sales representative and the MegaCorp sales manager for the Acme account, as depicted in the frame 600 of FIG. 6.

Following the output a feed item, which includes the reply to the comment on the communications recording, via a database record's information feed to users subscribed to the database record, a response to the reply and/or the comment is optionally received, block 124. The system can receive responses to replies and/or comments about communications recordings. For example, and without limitation, this can include the audio player component receiving a response 508 by Rachel Steiner, a MegaCorp customer support supervisor, to the reply 502 by Cindy Baker, a MegaCorp CRM administrator, to the comment 504 for the audio recording of the call between Jason Dewar, a MegaCorp customer support agent, and Debbie Vaughn, a buyer for the MegaCorp customer Acme Partners Inc., as depicted in the frame 500 of FIG. 5. Rachel's response 508 to Cindy's reply 502 to the comment 504 thanks Cindy for modifying the MegaCorp CRM system to recommend MegaCorp's business products as replacements when indicating that the requested MegaCorp Biz Pro Plan product is no longer available, as depicted in the frame 500 of FIG. 5. The audio player component enables any user who can read a comment or a reply to the comment in the media player's comment thread or in a feed item in an information feed to respond to the reply or the comment by entering a response to either the media player's comment thread or the feed item in the information feed. A response can be a remark that expresses an opinion and may be referred to as a comment in a comment thread.

Having received a response to a reply and/or a comment, the response is optionally added into a comment thread, block 126. The audio player component can add responses to replies and/or comments about a communications recording to the comment thread for the communications recording. By way of example and without limitation, this can include the audio player component adding the response 508 by Rachel Steiner, a MegaCorp customer support supervisor, to the reply 502 by Cindy Baker, a MegaCorp CRM administrator, to the comment 504 into the comment thread 506 for the audio recording of the call between Jason Dewar, a MegaCorp customer support agent, and Debbie Vaughn, a buyer for the MegaCorp customer Acme Partners Inc., as depicted in the frame 500 of FIG. 5.

After the addition of a response to a reply and/or a comment into a comment thread, whether another request is received to display the comment thread with a player control, which is associated with the communications recording, is optionally determined, block 128. The audio player component can determine when a media player needs to display a comment thread for a communications recording. In embodiments, this can include the audio player component determining whether Cindy Baker, a MegaCorp CRM administrator, is requesting an audio player to show the comment thread for the timeline of the audio recording of the call between Jason Dewar, a MegaCorp customer support agent, and Debbie Vaughn, a buyer for the MegaCorp customer Acme Partners Inc. If another request is received to display a comment thread with a player control, which is associated with a communications recording, the method 100 continues to block 130 to display the comment thread for the timeline of the communications recording. If another request is not received to display a comment thread with a player control, which is associated with a communications recording, the method 100 proceeds to block 132 to use an information feed to output a feed item that includes any responses to replies and/or comments on the communications recording to users who subscribe to the communications recording's database record.

If another request is received to display a comment thread with a player control, which is associated with a communications recording, the comment thread, which includes a response, is optionally caused to be displayed with a player control that is displayed by a media player, block 130. The audio player component can display responses to replies and/or comments for communications recordings. For example, and without limitation, this can include the audio player component displaying the comment thread 506 that includes the response 508 to the reply 502 to the comment 504 on the timeline from 11.5 to 32.5 seconds of the audio recording of the call between Jason Dewar, a MegaCorp customer support agent, and Debbie Vaughn, a buyer for the MegaCorp customer Acme Partners Inc., when Rachel Steiner, a MegaCorp customer support supervisor, requests the audio player to display the audio recording's comment thread, as depicted in the frame 500 of FIG. 5. Although this example describes the display of one comment thread, the audio player component can display any number of comment threads.

Following the receipt of a response to a reply and/or a comment on a communications recording, generation is optionally initiated of an additional feed item, which includes the response, thereby causing the additional feed item to be output via an information feed associated with a database record to any system user associated with a database record, block 132. The audio player component can initiate generation of a feed item for a response to a reply and/or a comment on a communications recording linked to a database record, which outputs the feed item via the database record's information feed to any users subscribed to the database record. By way of example and without limitation, this can include the audio player component initiating generation of a feed item 610 that includes the response 612 by Rachel Steiner, a MegaCorp customer support supervisor, to the reply 604 by Cindy Baker, a MegaCorp CRM administrator, to the comment 606 on the time range from 11.5 to 32.5 seconds of the audio recording of the call between Jason Dewar, a MegaCorp customer support agent, and Debbie Vaughn, a buyer for the MegaCorp customer Acme Partners Inc., as depicted in the frame 600 of FIG. 6. Rachel's response 612 to Cindy's reply 604 thanks Cindy for modifying the MegaCorp CRM system to recommend MegaCorp's business products as replacements when indicating that the requested MegaCorp Biz Pro Plan product is no longer available, as depicted in the frame 600 of FIG. 6.

Figure 6:
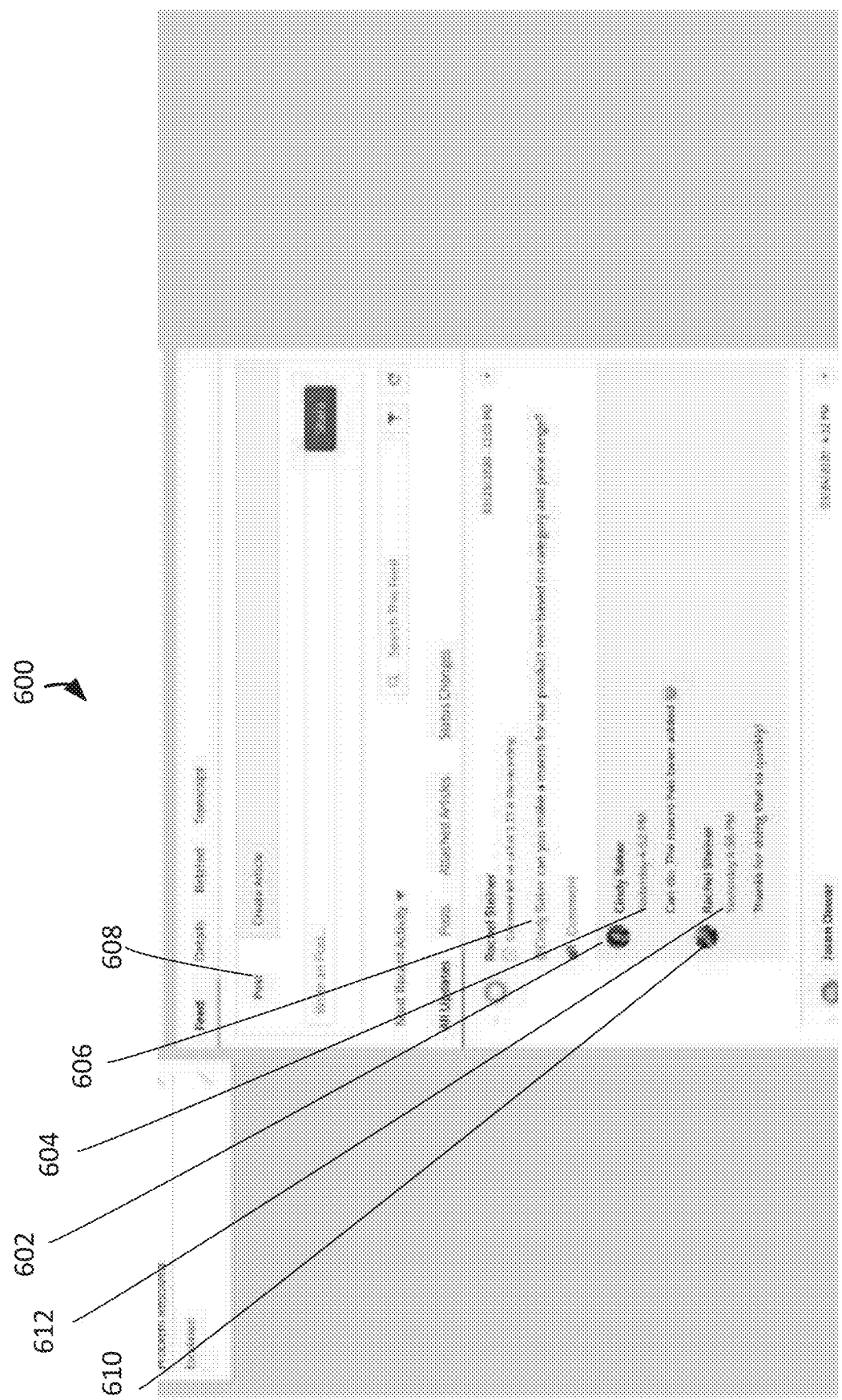
FIG. 6 depicts a frame 600 of an example user interface screen, which includes a comment thread's feed items, for leveraging time-based comments on communications recordings, in an embodiment.

By initiating the generation of the feed item 610, the audio player component causes the output of this feed item 610 via MegaCorp's information feed 608 for the Acme account to all of MegaCorp's CRM system users who are subscribed to the Acme account's information feed, including both the primary MegaCorp sales representative and the MegaCorp sales manager for the Acme account, as depicted in the frame 600 of FIG. 6. The media player component enables customer support organizations, customer service organizations, and sales organizations to give supervisors, quality managers, system administrators, customer support agents, sales representative, and sales managers a way to provide feedback and collaborate on previous customers' recorded conversations. For example, although Rachel Steiner, a MegaCorp customer support supervisor, did not communicate with Jason Dewar, a MegaCorp customer support agent, about his phone call with Debbie Vaughn, a buyer for the MegaCorp customer Acme Partners Inc., Rachel collaborated with Jason on the call by initiating a modification to MegaCorp's CRM system that can provide Jason with recommendations that he did not have during his call with Debbie.

Any comment, reply, and/or response may include at-mentions, links, files, images, emojis, and/or rich text. For example, the comment 606 by Rachel Steiner, a MegaCorp customer support supervisor, includes an at-mention @Cindy Baker for Cindy Baker, a MegaCorp CRM administrator, and Cindy's reply 604 includes a smiley face emoji. The audio player component enables each user to edit and/or delete their own comments, replies, and/or responses. For example, after initially replying to Rachel's comment 606, Cindy edited her reply 604 to include the smiley face emoji.

Any comment, reply, and/or response may be based on a machine-learning system identifying a sentiment and/or an intent associated with any comment, reply, and/or communication in a communications recording. For example, out of the hundreds of hours of her agents' recorded calls, Rachel Steiner, a MegaCorp customer support supervisor, chose to listen to the audio recording of the phone call between Jason Dewar, a MegaCorp customer support agent, Debbie Vaughn, a buyer for the MegaCorp customer Acme Partners Inc., because Rachel received a recommendation to listen to the call's recording from an artificial intelligence application. The artificial intelligence application sent this recommendation to Rachel after analyzing the hundreds of hours of her agents' recorded calls, determining that the audio recording of Jason's call with Debbie included the keyword Biz Pro Plan, inferring Debbie's sentiment was confused, and inferring Debbie's intent trended from an initial objection to a threatened cancellation of Acme's membership as a MegaCorp customer. In another example, the artificial intelligence application analyzed hundreds of hours of Rachel's agents' recorded calls, recommended to make the comment 606 to request modification of MegaCorp's CRM system to recommend MegaCorp's business products as replacements when indicating that the requested business product is no longer available. Upon receiving Rachel's approval, the artificial intelligence application made the comment 606 for the audio recording, either as Rachel or as the artificial intelligence application. In an alternative example, Rachel listened to the audio recording of the call between Jason and Debbie, and instead of making the comment 606 to request modification of MegaCorp's CRM system, made a comment that criticized Jason for not offering any of MegaCorp business products as replacements when he told Debbie that her requested MegaCorp Biz Pro Plan product is no longer available. The artificial intelligence application responded by analyzing Rachel's criticism of Jason and generating the comment 606 to request modification of MegaCorp's CRM system to recommend MegaCorp's business products as replacements when indicating that the requested business product is no longer available.

A machine-learning system can be an application of artificial intelligence to data that provides the ability to automatically learn and improve from experience without being explicitly programmed. A sentiment can be an attitude towards a situation or an event. An intent can be a purpose or an objective. A communication can be an exchange of information.

The frames 200-600 may be parts of larger display screens that include fields for users to enter commands to create, retrieve, edit, and store information. Because the frames 200-600 are samples, the frames 200-600 could vary greatly in appearance. For example, the relative sizes and positioning of the graphical images are not important to the practice of the present disclosure. The frames 200-600 may be depicted by any visual display, but they are preferably depicted by a computer screen. The frames 200-600 could also be output as reports and printed or saved in electronic formats, such as PDF.

The frames 200-600 may be parts of a personal computer system and/or a network, and operated from system data received by the network, and/or on the Internet. The frames 200-600 may be navigable by a user. Typically, a user can employ a touch screen input, voice command, or a mouse input device to point-and-click to locations on the frames 200-600 to manage the graphical images on the frames 200-600. Alternately or additionally, a user can employ directional indicators, or other input devices such as a keyboard. The graphical images depicted by the frames 200-600 are examples, as the frames 200-600 may include much greater amounts of graphical images. The frames 200-600 may also include fields in which a user can input information.

Figure 7:
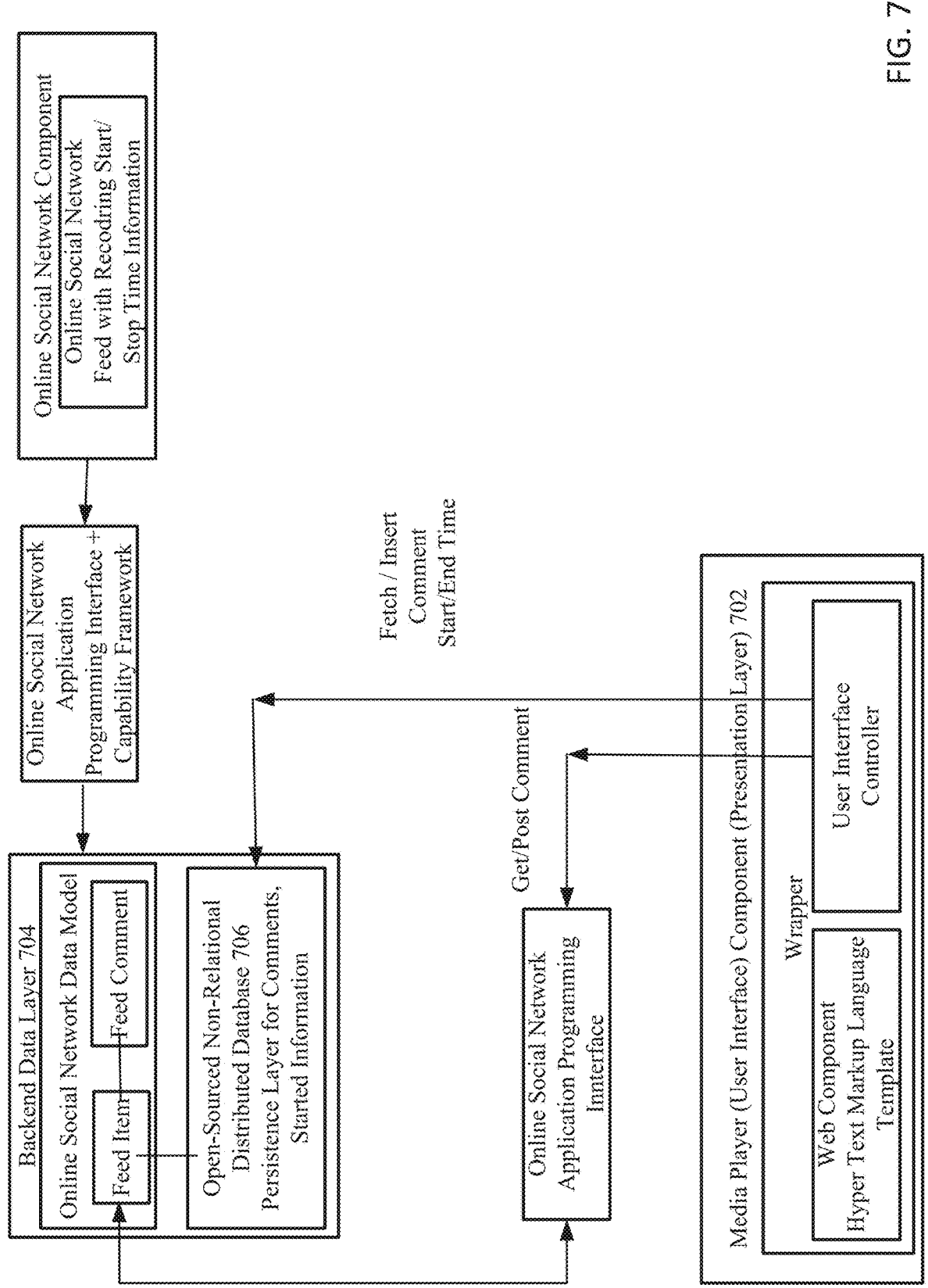
FIG. 7 depicts an example architecture and data flow diagram 700 for leveraging time-based comments on communications recordings, in an embodiment.

FIG. 7 depicts an example architecture and data flow diagram for leveraging time-based comments on communications recordings. The media player component (presentation layer) 702 makes a server call to the backend (data layer) 704 to fetch existing comments on the media player and to post new comments from the media player. The comments, text, and at-mention information are stored as online social network feed comments with a parent feed item. The comments which correspond to a snippet range, from a start time to an end time, are stored in an open-sourced non-relational distributed database 706, which may be a HBase entity 706, for high scalability reasons. When a user adds a new comment using the media player, a post request uses a standard online social network comment post Application Programming Interface (API) to post the new comment. For the first comment in a comment thread, an online social network feed item post API is used to create a new feed item and the subsequent comments are posted as online social network comments to the initial feed item. An insert is also made into the open-sourced non-relational distributed database 706 to store a start time and an end time for a comment thread. When a user loads a media player for the first time, a get request is made to the backend (data layer) 704 using the standard get feed item API to fetch all feed items and corresponding feed comments for the current call. This get request also queries the open-sourced non-relational distributed database 706 to get the start time and end time information which will subsequently be used to display the existing comments on the media player recording timeline. The following is an example get call:

```
{
"  body":{
        "messageSegments":[
            {
                "type":"Text",
                "text":"Please take a look at this file."
            }
        ]
    },
    "capabilities":{
        "callcollab":{
            "startsecond":20,
            "endsecond":50
        }
    }
}
```

After outputting feed items, which include comments on communications recordings, via database records' information feeds to users subscribed to the database records, whether a snippet type is identified for the comment thread which is associated with a communications recording is optionally determined, block 134. The system can analyze comments on audio recordings to identify types of snippets of audio recordings. In embodiments, this can include the audio player component identifying a snippet for coaching customer support agents to calm frustrated customers, based on the latest comment by Rachel Steiner, a MegaCorp customer support supervisor, praising Jason Dewar, a MegaCorp customer support agent, for calming a frustrated Debbie Vaughn, a buyer for the MegaCorp customer Acme Partners Inc. during the time range from 32.5 to 52.5 seconds in the audio recording of their call. A snippet type can be a category of a small piece or brief extract of an entity. If a snippet type has been identified for a comment thread which is associated with a communications recording, the method 100 continues to block 136 to store a snippet of the communications recording corresponding to a comment time. If a snippet type has not been identified for a comment thread which is associated with a communications recording, the method 100 proceeds to block 138 to determine whether a request is received for snippets which are a specific type of communication.

If a snippet type has been identified for a comment thread which is associated with a communications recording, a snippet of the communications recording corresponding to a comment time is optionally stored, with the comment thread, in a storage, block 136. The system can add short snippets corresponding to time ranges to a call library along with comments for each snippet. For example, and without limitation, this can include the audio player component creating a snippet for coaching customer support agents to calm frustrated customers, based on the latest comment by Rachel Steiner, a MegaCorp customer support supervisor, praising Jason Dewar, a MegaCorp customer support agent, for calming a frustrated Debbie Vaughn, a buyer for the MegaCorp customer Acme Partners Inc. Since the comment is for the time range from 32.5 to 52.5 seconds in the audio recording of the call, the audio player component extracts the snippet from 32.5 to 52.5 seconds in the recording and stores the snippet in a call library. A snippet can be a small piece or brief extract of an entity. A storage can be the retention of retrievable data on a computer.

Following the optional storing of a snippet of a communications recording in storage, whether a request is received for snippets which are associated with a type of communication is optionally determined, block 138. The audio player component can receive requests for specific types of snippets of audio recordings. By way of example and without limitation, this can include the audio player component receiving a request from Rachel Steiner, a MegaCorp customer support supervisor, for snippets to coach Jason Dewar, a MegaCorp customer support agent, to calm frustrated customers, If a request has been received for snippets which are associated with a type of communication, the method 100 continues to block 140 to output snippets of communication records which are the requested type of communication. If a request has not been received for snippets which are associated with a type of communication, the method 100 continues to block 142 to optionally trigger automated actions and/or flows based on comments and/or communications.

If a request has been received for snippets associated with a type of communication, snippets of communication records which are associated with the type of communication are optionally output from a storage, block 140. The audio player component can provide requested types of snippets from audio recordings in the call library along with any comments for each snippet. In embodiments, this can include the audio player component providing many snippets to Rachel Steiner, a MegaCorp customer support supervisor, for coaching Jason Dewar, a MegaCorp customer support agent, including the snippet of Jason calming a frustrated Debbie Vaughn, a buyer for the MegaCorp customer Acme Partners Inc. during the time range from 32.5 to 52.5 seconds in the audio recording of their call. A type can be a category of an entity. Call coaching gives system users insights about a call and can initiate discussion of identified keywords, which supplements the ability to collaborate and share findings.

Following the output of feed items, which include comments on communications recordings, via database records' information feeds to users subscribed to the database records, an addition, a deletion, and/or a modification is performed of at least one database record, by executing an automated action or an automated business process, based on analyzing a comment and/or at least one communication in a communications recording, block 142. The audio player component can trigger automated actions and/or flows based on comments and/or communications. For example, and without limitation, this can include the artificial intelligence application analyzing a comment by Rachel Steiner, a MegaCorp customer support supervisor, which criticized Jason Dewar, a MegaCorp customer support agent, for how he handled a phone call with Debbie Vaughn, a buyer for the MegaCorp customer Acme Partners Inc. Consequently, the artificial intelligence application creates a calendar invitation for Debbie Vaughn to discuss her concerns with the primary MegaCorp sales representative for the Acme account, and then links the invitation as a child record to MegaCorp's CRM Acme account record. The invitation may also be based on analysis of the call between Jason and Debbie during which Jason did not offer any of MegaCorp business products as replacements when he told Debbie that her requested MegaCorp Biz Pro Plan product was no longer available, and on the analysis which inferred Debbie's sentiment was confused and her intent trended from an initial objection to a threatened cancellation of Acme's membership as a MegaCorp customer. In another example, the artificial intelligence application creates a database record for a prospective order of MegaCorp business products by launching a salesforce.com lightning flow for ordering MegaCorp business products that are replacements for the MegaCorp Biz Pro Plan product that Debbie requested for Acme. When reviewing the options for the launched lightning flow's first page, the artificial intelligence application provides the specifications of the MegaCorp Biz Pro Plan product. The launched lightning flow's second page offers the available MegaCorp business products that Debbie can select. but the artificial intelligence application does not select any of these available MegaCorp business products. Instead, the artificial intelligence application pauses the launched lightning flow and then emails a link to the paused lightning flow's page to Debbie. If Debbie selects one of the paused lightning flow page's options to purchase any available MegaCorp business products, the lightning flow resumes, and thereby orders the selected available MegaCorp business products.

An addition can be the action of inserting an entity into a group of entities. A deletion can be the action of removing an entity from a group of entities. A modification can be the action of altering an entity to improve the entity. An automated action can be a task with little or no direct human control, to achieve an aim. An automated business process can be a collection of linked tasks with little or no direct human control, which find their end in the delivery of a service or product to a customer.

After outputting feed items, which include comments on communications recordings, via database records' information feeds to users subscribed to the database records, whether a request is received to view any transcript of any communications recording is optionally determined, block 144. The audio player component can receive requests to view transcripts of communications recordings. In embodiments, this can include the audio player component receiving a request from Rachel Steiner, a MegaCorp customer support supervisor, to view the transcript of the audio recording of the call between Jason Dewar, a MegaCorp customer support agent, and Debbie Vaughn, a buyer for the MegaCorp customer Acme Partners Inc. If a request is received to view a transcript of a communications recording, the method 100 continues to block 146 to output the transcript of the communications recording, which references a comment thread at a location in the transcript that corresponds to a comment time. If a request is not received to view a transcript of a communications recording, the method 100 terminates to process more comments on audio recordings. A transcript can be a textual version of material originally presented in another medium.

If a request is received to view a transcript of a communications recording, the transcript is optionally output of the communications recording, which references a comment thread at a location in the transcript that corresponds to a comment time, block 146. The audio player component can output transcripts of audio recordings which include the comments on the audio recording. For example, and without limitation, this can include the audio player component providing Rachel Steiner, a MegaCorp customer support supervisor, with a displayed transcript of the audio recording of the call between Jason Dewar, a MegaCorp customer support agent, and Debbie Vaughn, a buyer for the MegaCorp customer Acme Partners Inc. The transcript references Rachel's first comment, which asked to modify the MegaCorp CRM system, at the transcript's time range from 11.5 to 32.5 seconds and references Rachel's latest comment, which praised Jason for calming a frustrated Debbie, at the transcript's time range from 32.5 to 52.5 seconds. The transcript can reference comments by inserting the comments between the text of the audio recording, by creating footnotes or endnotes that include the comments, and/or by other means.

The method 100 may be repeated as desired. Although this disclosure describes the blocks 102-146 executing in a particular order, the blocks 102-146 may be executed in a different order. In other implementations, each of the blocks 102-146 may also be executed in combination with other blocks and/or some blocks may be divided into a different set of blocks.

System Overview

Figure 8:
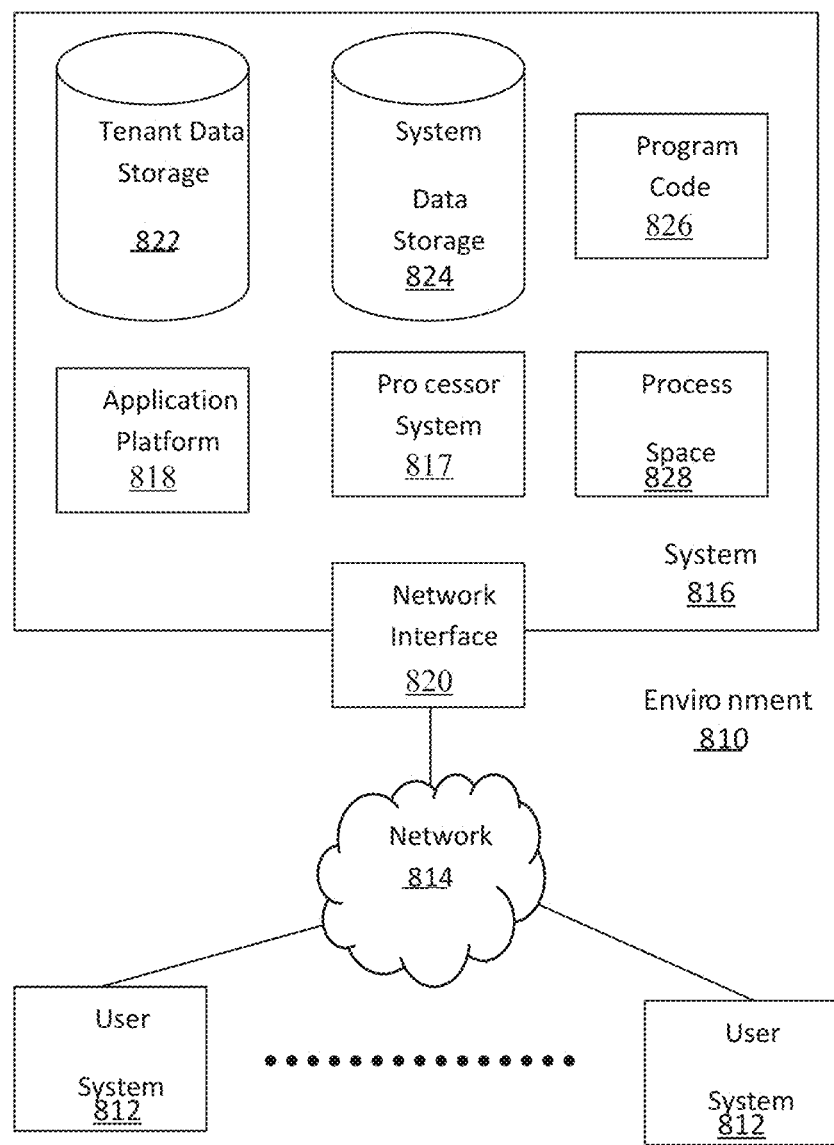
FIG. 8 illustrates a block diagram of an example of an environment 800 wherein an on-demand database service might be used.

FIG. 8 illustrates a block diagram of an environment 810 wherein an on-demand database service might be used. The environment 810 may include user systems 812, a network 814, a system 816, a processor system 817, an application platform 818, a network interface 820, a tenant data storage 822, a system data storage 824, program code 826, and a process space 828. In other embodiments, the environment 810 may not have all the components listed and/or may have other elements instead of, or in addition to, those listed above.

The environment 810 is an environment in which an on-demand database service exists. A user system 812 may be any machine or system that is used by a user to access a database user system. For example, any of the user systems 812 may be a handheld computing device, a mobile phone, a laptop computer, a workstation, and/or a network of computing devices. As illustrated in FIG. 8 (and in more detail in FIG. 9) the user systems 812 might interact via the network 814 with an on-demand database service, which is the system 816.

An on-demand database service, such as the system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 816" and the "system 816" will be used interchangeably herein. A database image may include one or more database objects. A relational database management system (RDMS) or the equivalent may execute storage and retrieval of information against the database object(s). The application platform 818 may be a framework that allows the applications of the system 816 to run, such as the hardware and/or software, e.g., the operating system. In an embodiment, the on-demand database service 816 may include the application platform 818 which enables creation, managing and executing one or more applications developed by the provider of the on-demand database service, users accessing the on-demand database service via user systems 812, or third-party application developers accessing the on-demand database service via the user systems 812.

The users of the user systems 812 may differ in their respective capacities, and the capacity of a particular user system 812 might be entirely determined by permissions (permission levels) for the current user. For example, where a salesperson is using a particular user system 812 to interact with the system 816, that user system 812 has the capacities allotted to that salesperson. However, while an administrator is using that user system 812 to interact with the system 816, that user system 812 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 814 is any network or combination of networks of devices that communicate with one another. For example, the network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 812 might communicate with the system 816 using TCP/IP and, at a higher network level, use other common Internet protocols to communicate, such as HTTP, FTP, AFS, WAP, etc. In an example where HTTP is used, the user systems 812 might include an HTTP client commonly referred to as a "browser" for sending and receiving HTTP messages to and from an HTTP server at the system 816. Such an HTTP server might be implemented as the sole network interface between the system 816 and the network 814, but other techniques might be used as well or instead. In some implementations, the interface between the system 816 and the network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 816, shown in FIG. 8, implements a web-based customer relationship management (CRM) system. For example, in one embodiment, the system 816 includes application servers configured to implement and execute CRM software applications as well as provide related data, code, forms, webpages and other information to and from the user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 816 implements applications other than, or in addition to, a CRM application. For example, the system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of the system 816 is shown in FIG. 8, including the network interface 820, the application platform 818, the tenant data storage 822 for tenant data 823, the system data storage 824 for system data 825 accessible to the system 816 and possibly multiple tenants, the program code 826 for implementing various functions of the system 816, and the process space 828 for executing MTS system processes and tenant-specific processes, such as running applications as part of an application hosting service. Additional processes that may execute on the system 816 include database indexing processes.

Several elements in the system shown in FIG. 8 include conventional, well-known elements that are explained only briefly here. For example, each of the user systems 812 could include a desktop personal computer, workstation, laptop, PDA, cell phone, or any wireless access protocol (WAP) enabled device or any other computing device capable of interfacing directly or indirectly to the Internet or other network connection. Each of the user systems 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 812 to access, process and view information, pages and applications available to it from the system 816 over the network 814. Each of the user systems 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 816 or other systems or servers. For example, the user interface device may be used to access data and applications hosted by the system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 812 and all of its components are operator configurable using applications, such as a browser, including computer code run using a central processing unit such as an Intel Pentium® processor or the like. Similarly, the system 816 (and additional instances of an MTS, where more than one is present) and all of their components might be operator configurable using application(s) including computer code to run using a central processing unit such as the processor system 817, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 816 is configured to provide webpages, forms, applications, data and media content to the user (client) systems 812 to support the access by the user systems 812 as tenants of the system 816. As such, the system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9:
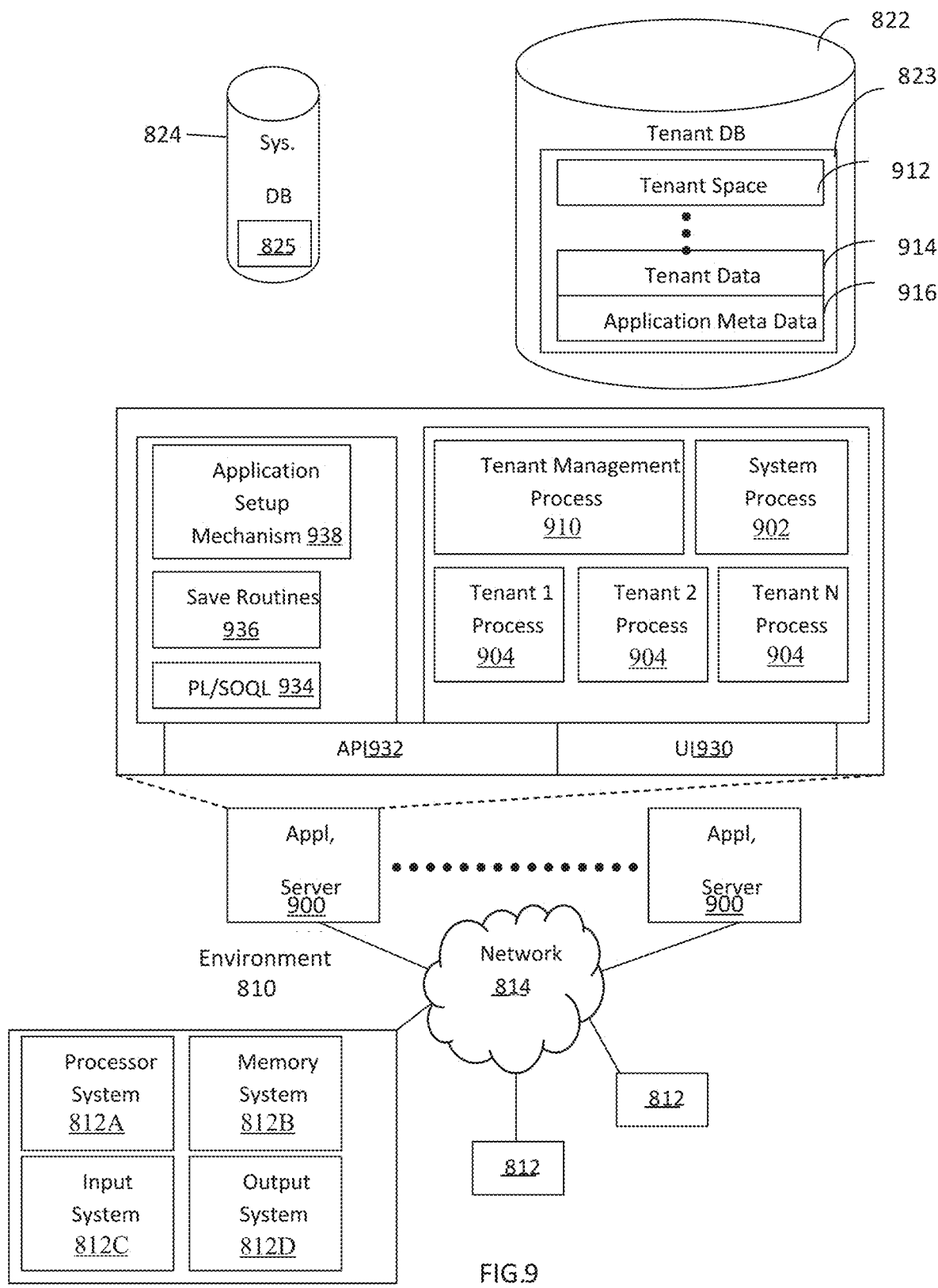
FIG. 9 illustrates a block diagram of an embodiment 900 of elements of FIG. 8 and various possible interconnections between these elements.

FIG. 9 also illustrates the environment 810. However, in FIG. 9 elements of the system 816 and various interconnections in an embodiment are further illustrated. FIG. 9 shows that the each of the user systems 812 may include a processor system 812A, a memory system 812B, an input system 812C, and an output system 812D. FIG. 9 shows the network 814 and the system 816. FIG. 9 also shows that the system 816 may include the tenant data storage 822, the tenant data 823, the system data storage 824, the system data 825, a User Interface (UI) 930, an Application Program Interface (API) 932, a PL/SOQL 934, save routines 936, an application setup mechanism 938, applications servers $900_1$-$900_N$, a system process space 902, tenant process spaces 904, a tenant management process space 910, a tenant storage area 912, a user storage 914, and application metadata 916. In other embodiments, the environment 810 may not have the same elements as those listed above and/or may have other elements instead of, or in addition to, those listed above.

The user systems 812, the network 814, the system 816, the tenant data storage 822, and the system data storage 824 were discussed above in FIG. 8. Regarding the user systems 812, the processor system 812A may be any combination of one or more processors. The memory system 812B may be any combination of one or more memory devices, short-term, and/or long-term memory. The input system 812C may be any combination of input devices, such as one or more keyboards, mice, trackballs, scanners, cameras, and/or interfaces to networks. The output system 812D may be any combination of output devices, such as one or more monitors, printers, and/or interfaces to networks. As shown by FIG. 9, the system 816 may include the network interface 820 (of FIG. 8) implemented as a set of HTTP application servers 900, the application platform 818, the tenant data storage 822, and the system data storage 824. Also shown is the system process space 902, including individual tenant process spaces 904 and the tenant management process space 910. Each application server 900 may be configured to access tenant data storage 822 and the tenant data 823 therein, and the system data storage 824 and the system data 825 therein to serve requests of the user systems 812.

The tenant data 823 might be divided into individual tenant storage areas 912, which may be either a physical arrangement and/or a logical arrangement of data. Within each tenant storage area 912, the user storage 914 and the application metadata 916 might be similarly allocated for each user. For example, a copy of a user's most recently used (MRU) items might be stored to the user storage 914. Similarly, a copy of MRU items for an entire organization that is a tenant might be stored to the tenant storage area 912. The UI 930 provides a user interface, and the API 932 provides an application programmer interface to the system 816 resident processes to users and/or developers at the user systems 812. The tenant data and the system data may be stored in various databases, such as one or more Oracle™ databases.

The application platform 818 includes the application setup mechanism 938 that supports application developers' creation and management of applications, which may be saved as metadata into the tenant data storage 822 by the save routines 936 for execution by subscribers as one or more tenant process spaces 904 managed by the tenant management process 910 for example. Invocations to such applications may be coded using the PL/SOQL 934 that provides a programming language style interface extension to the API 932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes.

Invocations to applications may be detected by one or more system processes, which manages retrieving the application metadata 916 for the subscriber making the invocation and executing the metadata as an application in a virtual machine.

Each application server 900 may be communicably coupled to database systems, e.g., having access to the system data 825 and the tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user could hit three different application servers 900, and three requests from different users could hit the same application server 900. In this manner, the system 816 is multi-tenant, wherein the system 816 handles storage of, and access to, different objects, data and applications across disparate users and organizations.

As an example of storage, one tenant might be a company that employs a sales force where each salesperson uses the system 816 to manage their sales process. Thus, a user might maintain contact data, leads data, customer follow-up data, performance data, goals and progress data, etc., all applicable to that user's personal sales process (e.g., in the tenant data storage 822). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 816 might also maintain system level data usable by multiple tenants or other data. Such system level data might include industry reports, news, postings, and the like that are sharable among tenants.

In certain embodiments, the user systems 812 (which may be client systems) communicate with the application servers 900 to request and update system-level and tenant-level data from the system 816 that may require sending one or more queries to the tenant data storage 822 and/or the system data storage 824. The system 816 (e.g., an application server 900 in the system 816) automatically generates one or more SQL statements (e.g., one or more SQL queries) that are designed to access the desired information. The system data storage 824 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

The invention claimed is:

1. A system for leveraging time-based comments on communications recordings, the system comprising:
   one or more processors; and
   a non-transitory computer readable medium storing a plurality of instructions, which when executed, cause the one or more processors to:
   determine a comment time for a communications recording associated with a database record;
   generate a comment thread that comprises a comment, in response to receiving the comment for the communications recording;
   link the comment thread with the communications recording after the communications recording is stored on the system and linked to the database record;
   cause the comment time and at least one of the comment thread or a comment thread indicator to be displayed with a player control that is displayed by a media player, in response to a determination that the media player is displaying the player control, which is used during playback of the communications recording; and
   cause a feed item, comprising the comment and referencing the communications recording, to be outputted via an information feed of the database record to any system user with access to the database record, by initiating generation of the feed item.

2. The system of claim 1, comprising further instructions, which when executed, cause the one or more processors to:
   add a reply to the comment into the comment thread, in response to receiving the reply;
   cause the comment thread, which includes the reply, to be displayed with the player control that is displayed by the media player, in response to a determination that a request is received to display the comment thread with the player control, which is used during playback of the communications recording; and
   cause another feed item, comprising the reply, to be outputted via the information feed associated with the database record to any system user associated with the database record, by initiating generation of the other feed item.

3. The system of claim 2, comprising further instructions, which when executed, cause the one or more processors to:
   add a response to at least one of the reply and the comment into the comment thread, in response to receiving the response;
   cause the comment thread, which includes the response, to be displayed with the player control that is displayed by the media player, in response to a determination that another request is received to display the comment thread with the player control, which is used during playback of the communications recording; and
   cause an additional feed item, comprising the response, to be outputted via the information feed associated with the database record to any system user with access to the database record, by initiating generation of the additional feed item.

4. The system of claim 3, wherein at least one of the comment, the reply, and the response is based on a machine-learning system identifying at least one of a sentiment and an intent associated with at least one of the comment, the reply, and at least one communication in the communications recording, and the comment time corresponds to a start time of a part of the communications recording and a stop time of the part of the communications recording.

5. The system of claim 1, comprising further instructions, which when executed, cause the one or more processors to:
store a snippet of the communications recording, corresponding to the comment time, with the comment thread, into a storage, in response to a determination that a snippet type is identified for the comment thread which is linked to the communications recording; and
cause a plurality of snippets of communications recordings, which are associated with a type of communication, to be outputted from the storage, in response to a determination that a request is received for snippets which are associated with the type of communication.

6. The system of claim 1, comprising further instructions, which when executed, cause the one or more processors to perform at least one of an addition, a deletion, and a modification of at least one database record, by executing one of an automated action and an automated business process, based on analyzing at least one of the comment and at least one communication in the communications recording.

7. The system of claim 1, comprising further instructions, which when executed, cause the one or more processors to cause a transcript of the communications recording, which references the comment thread at a location in the transcript that corresponds to the comment time, to be outputted, in response to a determination that a request is received to view the transcript of the communications recording.

8. A computer program product comprising computer-readable program code to be executed by one or more processors when retrieved from a non-transitory computer-readable medium, the program code including instructions to:
determine a comment time for a communications recording associated with a database record;
generate a comment thread that comprises a comment, in response to receiving the comment for the communications recording;
link the comment thread with the communications recording after the communications recording is stored on the system and linked to the database record;
cause the comment time and at least one of the comment thread or a comment thread indicator to be displayed with a player control that is displayed by a media player, in response to a determination that the media player is displaying the player control, which is used during playback of the communications recording; and
cause a feed item, comprising the comment and referencing the communications recording, to be outputted via an information feed of the database record to any system user with access to the database record, by initiating generation of the feed item.

9. The computer program product of claim 8, wherein the program code comprises further instructions to:
add a reply to the comment into the comment thread, in response to receiving the reply;
cause the comment thread, which includes the reply, to be displayed with the player control that is displayed by the media player, in response to a determination that a request is received to display the comment thread with the player control, which is used during playback of the communications recording; and
cause another feed item, comprising the reply, to be outputted via the information feed associated with the database record to any system user associated with the database record, by initiating generation of the other feed item.

10. The computer program product of claim 9, wherein the program code comprises further instructions to:
add a response to at least one of the reply and the comment into the comment thread, in response to receiving the response;
cause the comment thread, which includes the response, to be displayed with the player control that is displayed by the media player, in response to a determination that another request is received to display the comment thread with the player control, which is used during playback of the communications recording; and
cause an additional feed item, comprising the response, to be outputted via the information feed associated with the database record to any system with access to the database record, by initiating generation of the additional feed item.

11. The computer program product of claim 10, wherein at least one of the comment, the reply, and the response is based on a machine-learning system identifying at least one of a sentiment and an intent associated with at least one of the comment, the reply, and at least one communication in the communications recording, and the comment time corresponds to a start time of a part of the communications recording and a stop time of the part of the communications recording.

12. The computer program product of claim 8, wherein the program code comprises further instructions to:
store a snippet of the communications recording, corresponding to the comment time, with the comment thread, into a storage, in response to a determination that a snippet type is identified for the comment thread which is linked to the communications recording; and
cause a plurality of snippets of communications recordings, which are associated with a type of communication, to be outputted from the storage, in response to a determination that a request is received for snippets which are associated with the type of communication.

13. The computer program product of claim 8, wherein the program code comprises further instructions to perform at least one of an addition, a deletion, and a modification of at least one database record, by executing one of an automated action and an automated business process, based on analyzing at least one of the comment and at least one communication in the communications recording.

14. The computer program product of claim 8, wherein the program code comprises further instructions to cause a transcript of the communications recording, which references the comment thread at a location in the transcript that corresponds to the comment time, to be outputted, in response to a determination that a request is received to view the transcript of the communications recording.

15. A computer-implemented method for leveraging time-based comments on communications recordings, the computer-implemented method comprising:
determining, by a database system, a comment time for a communications recording associated with a database record;
generating, by the database system, a comment thread that comprises a comment, in response to receiving the comment for the communications recording;
linking the comment thread with the communications recording after the communications recording is stored on the system and linked to the database record;
causing, by the database system, the comment time and at least one of the comment thread or a comment thread indicator to be displayed with a player control that is displayed by a media player, in response to a determination that the media player is displaying the player control, which is used during playback of the communications recording; and causing, by the database system, a feed item, comprising the comment and referencing the communications recording, to be outputted via an information feed of the database record to any system user with access to the database record, by initiating generation of the feed item.

16. The computer-implemented method of claim 15, the computer-implemented method further comprising:

adding, by the database system, a reply to the comment into the comment thread, in response to receiving the reply;

causing, by the database system, the comment thread, which includes the reply, to be displayed with the player control that is displayed by the media player, in response to a determination that a request is received to display the comment thread with the player control, which is used during playback of the communications recording; and causing, by the database system, another feed item, comprising the reply, to be outputted via the information feed associated with the database record to any system user associated with the database record, by initiating generation of the other feed item.

17. The computer-implemented method of claim 16, the computer-implemented method further comprising:

adding, by the database system, a response to at least one of the reply and the comment into the comment thread, in response to receiving the response;

causing, by the database system, the comment thread, which includes the response, to be displayed with the player control that is displayed by the media player, in response to a determination that another request is received to display the comment thread with the player control, which is used during playback of the communications recording; and causing, by the database system, an additional feed item, comprising the response, to be outputted via the information feed associated with the database record to any system user with access to the database record, by initiating generation of the additional feed item, by initiating generation of the additional feed item.

18. The computer-implemented method of claim 17, wherein at least one of the comment, the reply, and the response is based on a machine-learning system identifying at least one of a sentiment and an intent associated with at least one of the comment, the reply, and at least one communication in the communications recording, and the comment time corresponds to a start time of a part of the communications recording and a stop time of the part of the communications recording.

19. The computer-implemented method of claim 15, the computer-implemented method further comprising:

storing, by the database system, a snippet of the communications recording, corresponding to the comment time, with the comment thread, into a storage, in response to a determination that a snippet type is identified for the comment thread linked to the communications recording; and causing, by the database system, a plurality of snippets of communications recordings, which are associated with a type of communication, to be outputted from the storage, in response to a determination that a request is received for snippets which are associated with the type of communication.

20. The computer-implemented method of claim 15, the computer-implemented method further comprising:

performing, by the database system, at least one of an addition, a deletion, and a modification of at least one database record, by executing one of an automated action and an automated business process, based on analyzing at least one of the comment and at least one communication in the communications recording; and causing, by the database system, a transcript of the communications recording, which references the comment thread at a location in the transcript that corresponds to the comment time, to be outputted, in response to a determination that a request is received to view the transcript of the communications recording.

* * * * *